US009919495B2

(12) United States Patent
Wilson et al.

(10) Patent No.: US 9,919,495 B2
(45) Date of Patent: Mar. 20, 2018

(54) FIBER-METAL LAMINATE (71) Applicant: GTM-Advanced Products B.V., The Hague (NL)

(72) Inventors: Gregory Wilson, Delft (NL); Rene Alderliesten, Delft (NL); Jan Willem Gunnink, Nieuwerkerk a/d IJssel (NL)

(73) Assignee: GTM-Advanced Products B.V., 's-Gravenhage (NL)

( * ) Notice: Subject to any disclaimer, the term of this patent is extended or adjusted under 35 U.S.C. 154(b) by 0 days.

(21) Appl. No.: 14/355,119

(22) PCT Filed: Oct. 31, 2012

(86) PCT No.: PCT/NL2012/050759
§ 371 (c)(1),
(2) Date: Apr. 29, 2014

(87) PCT Pub. No.: WO2013/066173
PCT Pub. Date: May 10, 2013

(65) Prior Publication Data
US 2014/0329069 A1 Nov. 6, 2014

(30) Foreign Application Priority Data

Oct. 31, 2011 (NL) .................................... 2007683

(51) Int. Cl.
*B32B 15/092* (2006.01)
*G01B 21/08* (2006.01)
(Continued)

(52) U.S. Cl.
CPC .............. *B32B 15/092* (2013.01); *B32B 5/02* (2013.01); *B32B 7/02* (2013.01); *B32B 15/14* (2013.01);
(Continued)

(58) Field of Classification Search
CPC ......... B32B 15/092; B32B 15/14; B32B 5/02; B32B 7/02; B32B 2250/42;
(Continued)

(56) References Cited

U.S. PATENT DOCUMENTS 4,500,589 A   2/1985  Schijve et al.
4,992,323 A   2/1991  Vogelesang et al.
(Continued)

FOREIGN PATENT DOCUMENTS

EP   0312150 A1   4/1989
EP   0312151 A1   4/1989
(Continued)

OTHER PUBLICATIONS

Mathivanan, P., M. Balakrishnan, and H. Krishnan. "Metal Thickness, Fiber Volume Fraction Effect on the Tensile Properties, Debonding of Hybrid Laminates." Journal of Reinforced Plastics and Composites 29.14 (2010): 2128-2140.*
(Continued)

*Primary Examiner* — Aaron Austin
*Assistant Examiner* — Michael Zhang
(74) *Attorney, Agent, or Firm* — The Webb Law Firm (57) ABSTRACT

A fiber-metal laminate of mutually bonded fiber-reinforced composite layers and metal sheets comprises a combination of a fiber-reinforced composite layer and an adjacent metal sheet, in which combination the properties satisfy the following relations:
$E_{lam}*E_{comp}/(E_{metal}*t_{metal}^2)$ has a value between a lower bound given by $a*(Vf-c)^{(b/(Vf-c))}$ with $b=0.36$ and $c=0.3$   (1a)

and zero when $Vf \leq 0.3$,   (1b)

and an upper bound given by (Continued)

$$a*(Vf-c)^{(b/(Vf-c))} \text{ with } b=0.88 \text{ and } c=0 \quad (1c)$$

$$0.10 \leq Vf < 0.54 \quad (2)$$

$$0 < E_{lam}*E_{comp}/(E_{metal}*t_{metal}^2) < 400*Vf \text{ kN/mm}^4 \quad (3)$$

wherein $a=1200$ kN/mm$^4$; and
$E_{comp}$=tensile Young's modulus of the fiber-reinforced composite layer in kN/mm$^2$ in the combination, taken in the direction of highest stiffness of the composite layer
$E_{lam}$=tensile Young's modulus of the total fiber-metal laminate in kN/mm$^2$, taken in the same direction as for $E_{comp}$
$E_{metal}$=tensile Young's modulus of the metal sheet in kN/mm$^2$ in the combination
$t_{metal}$=thickness of the metal sheet in mm in the combination
$V_f$=fiber volume fraction of the fiber-reinforced composite layer in the combination.

18 Claims, 9 Drawing Sheets

(51) Int. Cl.
  *B32B 7/02* (2006.01)
  *B32B 5/02* (2006.01)
  *B32B 15/14* (2006.01)
(52) U.S. Cl.
  CPC .......... *G01B 21/08* (2013.01); *B32B 2250/05* (2013.01); *B32B 2250/42* (2013.01); *B32B 2260/021* (2013.01); *B32B 2260/023* (2013.01); *B32B 2260/046* (2013.01); *B32B 2262/101* (2013.01); *B32B 2262/106* (2013.01); *B32B 2305/07* (2013.01); *B32B 2305/08* (2013.01); *B32B 2605/18* (2013.01); *Y10T 428/2495* (2015.01); *Y10T 428/249924* (2015.04); *Y10T 428/31529* (2015.04)
(58) Field of Classification Search
  CPC .......... B32B 2250/05; B32B 2260/023; B32B 2260/021; B32B 2260/046; B32B 2262/101; B32B 2262/106; B32B 2305/07; B32B 2605/18; B32B 2305/08; G01B 21/08; Y10T 428/2495; Y10T 428/249924; Y10T 428/31529
  See application file for complete search history.

(56) References Cited

U.S. PATENT DOCUMENTS

| | | | |
|---|---|---|---|
| 5,039,571 | A | 8/1991 | Vogelesang et al. |
| 5,547,735 | A * | 8/1996 | Roebroeks ............ B29C 70/088 428/110 |
| 2008/0172959 | A1* | 7/2008 | Pellenkoft et al. ............. 52/213 |
| 2010/0266867 | A1 | 10/2010 | Roebroeks et al. |
| 2011/0052910 | A1 | 3/2011 | Gunnink et al. |
| 2011/0256370 | A1 | 10/2011 | Roebroeks et al. |

FOREIGN PATENT DOCUMENTS

| | | |
|---|---|---|
| EP | 0322947 B1 | 7/1992 |
| WO | 2007145512 A1 | 12/2007 |
| WO | 2009095381 A1 | 8/2009 |

OTHER PUBLICATIONS

Wallenberger, F., & Bingham, P. Fiberglass and Glass Technology: energy-friendly compositions and applications. 2010.*
Liu, Jianjun, and Benjamin Liaw. "Vibration and impulse responses of fiber-metal laminated beams." Proceedings of IMAC-XX: A Conference on Structural Dynamics, Los Angeles, CA, Feb. 2002.*
Wu, Guocai, and J-M. Yang. "The mechanical behavior of GLARE laminates for aircraft structures." JOM Journal of the Minerals, Metals and Materials Society 57.1 (2005): 72-79.*
Mathivanan, P. et al., Metal Thickness, Fiber Volume Fraction Effect on the Tensile Properties, Debonding of Hybrid Laminates, Journal of Reinforced Plastics and Composites, Jul. 2010, pp. 2129-2138, vol. 29, No. 14.
Van Rooijen, R. et al., Property Optimisation in Fibre Metal Laminates, Applied Composite Materials, Mar. 2004, pp. 63-76, vol. 11, No. 2.

* cited by examiner

FIBER-METAL LAMINATE

CROSS-REFERENCE TO RELATED APPLICATIONS

This application is the United States national phase of International Application No. PCT/NL2012/050759 filed Oct. 31, 2012, and claims priority to Netherlands Patent Application No. 2007683 filed Oct. 31, 2011, the disclosures of which are hereby incorporated in their entirety by reference.

FIELD OF THE INVENTION

The present invention relates to a fiber-metal laminate comprising mutually bonded fiber-reinforced composite layers and metal sheets. More particularly, the invention relates to a fiber-metal laminate comprising mutually bonded fiber-reinforced composite layers and metal sheets having an optimal configuration.

BACKGROUND OF THE INVENTION

The behavior of engineering structures under load is determined by many design parameters, and defining the optimum material for a specific application is often a tedious task and moreover has to deal with conflicting requirements. Among the commonly used engineering materials are metals, like steel alloys, titanium alloys, magnesium alloys, aluminum alloys; fiber-reinforced composites, like glass fiber composites, carbon fiber composites, and aramid composites; and hybrid materials, further defined below.

Fiber-reinforced composites offer considerable weight advantage over other preferred materials, such as metals. Generally, the weight savings are obtained at the sacrifice of other important material properties such as ductility, toughness, bearing strength, conductivity and cold forming capability. To overcome these deficiencies, new hybrid materials called fiber-metal laminates have been developed to combine the best attributes of metal and composites.

Fiber-metal laminates (also referred to as FML), such as those described in U.S. Pat. No. 4,500,589 for instance are obtained by stacking alternating sheets of metal (most preferably aluminum) and fiber-reinforced prepregs, and curing the stack under heat and pressure. These materials are increasingly used in industries such as the transportation industry, for example in ships, cars, trains, aircraft and spacecraft. They can be used as sheets and/or a reinforcing element and/or as a stiffener for (body) structures of these transports, like for aircraft for wings, fuselage and tail panels and/or other skin panels and structural elements of aircraft.

WO 2009/095381 A1 discloses a fiber-metal laminate wherein the metal volume fraction ranges between 0 and 47%.

WO 2007/145512 A1 discloses a fiber-metal laminate comprising thick metal sheets with a thickness above 1 mm. The thick metal sheets are bonded to other layers of the laminate by a fiber-reinforced composite layer having a fiber volume fraction $V_f$ of lower than 45%.

EP 0312150 A1 and EP 0312151 A1 describe other useful fiber-metal laminates.

Although fiber-metal laminates may provide improved resistance to fatigue (in particular crack propagation) over metal alloys, in particular aluminum alloys, their behavior in a structure is still open for improvement, in particular in structures that are subject to dynamic loadings and need also high static strength and in particular high strength for mechanical joining. An important characteristic in this respect is resistance to crack growth as well as good joint strength of the structure. It would be highly desirable if the right metal sheets and fiber-reinforced composite layers could be identified in terms of their properties in view of achieving the lowest crack growth rate of the corresponding fiber-metal laminate with adequate joint strength performance.

Fiber-metal laminates of the type of those according to the invention are preferably connected to other components of a structure, and therefore may be provided with notches to accomplish the connection. Such notches provide stress concentrations that may negatively influence fatigue life. It is a further object of the invention to provide a fiber-metal laminate comprising mutually bonded fiber-reinforced composite layers and metal sheets, having an optimal notch performance in dynamic loading.

It is an object of the invention to provide a fiber-metal laminate comprising mutually bonded fiber-reinforced composite layers and metal sheets with an optimal structural response in dynamic loading, in particular with the lowest crack growth rate giving simultaneously adequate joint strength.

SUMMARY OF THE INVENTION

According to one aspect of the present invention there is provided a fiber-metal laminate comprising mutually bonded fiber-reinforced composite layers and metal sheets having a range of fiber and metal properties that yield an optimal structural response.

In accordance with another aspect of the present invention, a fiber-metal laminate of mutually bonded fiber-reinforced composite layers and metal sheets is provided, the laminate comprising a combination of a fiber-reinforced composite layer and an adjacent metal sheet, for which combination the following relations are satisfied:

$E_{lam}*E_{comp}/(E_{metal}*t_{metal}^2)$ has a value between a lower bound value given by $$a*(Vf-c)^{(b/(Vf-c))} \text{ with } b=0.36 \text{ and } c=0.3 \tag{1a}$$

$$\text{and zero when } Vf \le 0.3, \tag{1b}$$

and an upper bound value given by $$a*(Vf-c)^{(b/(Vf-c))} \text{ with } b=0.88 \text{ and } c=1 \tag{1c}$$

$$0.10 \le Vf < 0.54 \tag{2}$$

$$E_{lam}*E_{comp}/(E_{metal}*t_{metal}^2) < 400*Vf \text{ (kN/mm}^4\text{)} \tag{3}$$

wherein $a=1200$ kN/mm$^4$; and $E_{comp}$=tensile Young's modulus of the fiber-reinforced composite layer in kN/mm$^2$ in the combination, taken in the direction of highest stiffness of the composite layer $E_{lam}$=tensile Young's modulus of the total fiber-metal laminate in kN/mm$^2$, taken in the same direction as $E_{comp}$ $E_{metal}$=tensile Young's modulus of the metal sheet in kN/mm$^2$ in the combination $t_{metal}$=thickness of the metal sheet in mm in the combination $V_f$=fiber volume fraction of the fiber-reinforced composite layer in the combination A value of $E_{lam}*E_{comp}/(E_{metal}*t_{metal}^2)$ between the lower bound and the upper bound has to be understood as including the extreme lower and upper bound values.

The relations (1) to (3) define the optimum properties of a fiber-reinforced composite layer (these properties depend on the fiber-volume fraction of the layer) and the properties of a metal sheet adjacent to said fiber-reinforced composite layer in terms of fatigue resistance of the fiber-metal laminate. Combinations of $V_f$ and $t_{metal}$ that satisfy relations (1) to (3) yield a maximum number of fatigue life cycles in a fatigue test, in particular in a notched fatigue test, and simultaneously provide an improved joint performance.

The metal sheets in fiber-metal laminates according to one aspect of the invention are selected such that $E_{lam}*E_{comp}/(E_{metal}*t_{metal}^2)<400*Vf$ (kN/mm$^4$). It appears that such metal sheets contribute to a large extent to the joint strength of the laminate. It is well-known that for highly loaded structures, like lower wing of aircraft for instance, the known standard fiber-metal laminates, such as GLARE laminates, having aluminum alloy layers with in general thicknesses of 0.4 mm and below, show limited joint strength performance. Such known fiber-metal laminates having values of $E_{lam}*E_{comp}/(E_{metal}*t_{metal}^2) \geq 400*Vf$ N/mm$^4$ are therefore outside the scope of the invention.

It is sufficient when in a fiber-metal laminate only one fiber-composite layer and one metal sheet adjacent to it satisfy the relations (1) to (3). There is no need therefore that all metal sheets have a thickness that satisfy relations (1) and (3) nor that all fiber-reinforced composite layers satisfy relations (1) to (3). In an embodiment of a fiber-metal laminate according to the invention however, the properties in any combination of a fiber-reinforced composite layer and an adjacent metal sheet satisfy the relations (1) to (3).

Another embodiment of the fiber-metal laminate according to the invention is characterized in that the properties in a combination of a fiber-reinforced composite layer and two adjacent metal sheets of different thickness, the thicker of the two adjacent metal sheets satisfy the relations (1) to (3).

It is to be understood that when speaking about 'the thickness' of the metal and fiber composite layers, it is implied that such metal and fiber composite layers have a constant thickness. However the layers can also have a variable thickness, such as with tapered metal sheets. In such cases the thickness is to be understood as the mean thickness.

In a particularly preferred embodiment of the fiber-metal laminate in accordance with the invention, the laminate comprises metal sheets wherein $E_{lam}*E_{comp}/(E_{metal}*t_{metal}^2)<300*Vf$ (kN/mm$^4$), more preferably $E_{lam}*E_{comp}/(E_{metal}*t_{metal}^2)<250*Vf$ (kN/mm$^4$), and most preferably $E_{lam}*E_{comp}/(E_{metal}*t_{metal}^2)<200*Vf$ (kN/mm$^4$). Such laminates show an increasingly improved joint strength performance and simultaneously good notch fatigue performance.

Another preferred embodiment of the fiber laminate has fibers in the fiber-reinforced composite layers with $E_{fiber} \geq 80$ GPa, more preferred $E_{fiber} \geq 85$ GPa, and most preferred $E_{fiber} \geq 90$ GPa.

A fiber-reinforced composite layer in the laminate of the invention is defined to be a layer that extends from one metal sheet to another (or to an end surface of the laminate). Such a layer may comprise one or more composite lamina, in which latter case the laminae are stacked to form the layer. The fiber-reinforced composite layers or laminae preferably comprise fibers in substantially one direction (so-called unidirectional or UD composites) although layers or laminae may also be cross-plies, having reinforcing fibers running in mutually perpendicular directions, angle plies, having fibers running in directions that differ form the main loading direction, and any combination thereof. The use of woven fabrics in the fiber-reinforced layers is not preferred and therefore excluded in a preferred embodiment.

The fiber-reinforced composite layers in the laminate of the invention may will preferably have anisotropic properties, i.e. stiffness and strength properties vary according to the direction in which they are determined. According to the invention, the tensile Young's modulus of the fiber-reinforced composite layers in the laminate in equations (1) to (3) is taken in the direction of highest stiffness, which corresponds to the direction along which the majority of the fibers is aligned. When the fiber-reinforced composite layers in the laminate of the invention show anisotropic properties, the same may hold for the laminate. The tensile Young's modulus of the total fiber-metal laminate in equations (1) to (3) is therefore also defined as taken in the same direction as the modulus of the fiber-reinforced composite layers.

The invention further relates to a method for obtaining the metal sheet thickness and fiber volume fraction of the fiber-reinforced composite layers in a fiber-metal laminate comprising mutually bonded fiber-reinforced composite layers and metal sheets in order to obtain optimum fatigue properties of the fiber-metal laminate, the method comprising selecting a combination of a fiber-reinforced composite layer and an adjacent metal sheet, selecting one of the metal sheet thickness or fiber volume fraction, and calculating the corresponding fiber volume fraction or metal sheet thickness that satisfies the above described relations (1) to (3). Laminates according to the invention use a fiber composite-metal combination that satisfies the relations (1) to (3), and such configurations may be obtained by first selecting a metal and a fiber reinforced composite and determining the tensile Young's modulus at room temperature of both, assuming a starting value for the fiber volume fraction $V_f$ of the fiber reinforced composite, taking into account relation (2). A starting value for the thickness of the metal sheets $t_{metal}$ or for the fiber volume fraction $V_f$ is then selected and checked against Eq. (1) and (3). Please note that the thickness of the metal sheets $t_{metal}$ and the fiber volume fraction $V_f$ of the composite layer are both needed to calculate the tensile Young's modulus $E_{lam}$ of the fiber-metal laminate. The selection of starting values for $t_{metal}$ and $V_f$ is aided by the notion that as metal sheet thickness increases $V_f$ should generally decrease and vice versa to simultaneously satisfy the Eq. (1) to (3).

Preferred embodiments of the method are given in the appended claims.

A fiber-metal laminate satisfying the relations (1) to (3) shows optimal properties, by which is meant a good joint performance as well as a lower crack growth rate than fiber reinforced laminates that do not satisfy the relations (1) to (3). This teaching has not been disclosed before and the combination of metal sheet thickness and composite fiber volume fraction that offers the lowest crack growth rate can now be determined.

To obtain a specifically robust fiber-metal laminate according to the invention, a fiber-metal laminate according to appended claim 2 is preferred. A fiber-metal laminate in accordance with this embodiment not only exhibits a high resistance against crack growth with good joint performance, but can also achieve a higher stiffness, which is for instance important for performance in compression and for aero-elastic performance.

Compared to engineered composites, laminates according to the invention are hardly sensitive to compression after impact degradation (quite often even better than its metal ingredient) and therefore can be designed with a substantial higher strain to failure than for fiber composite structures. Furthermore, combining the fibrous composite layers and the metal sheets with properties that satisfy equations (1) to (3) results in general in a fiber-metal laminate with a higher stiffness than the corresponding metal sheets have above their proportionality limit, and consequently will have increased yield strength.

In another embodiment of the invention a fiber-metal laminate is provided wherein the fiber volume fraction of the fiber-reinforced composite layers satisfies $V_f<0.50$. This is quite in contrast with the general teaching that fiber-composite properties improve with increasing fiber volume fraction and therefore $V_f$ should be as high as possible.

An embodiment of the fiber-metal laminate according to the invention wherein the fiber volume fraction of the fiber-reinforced composite layers satisfies $0.10<V_f<0.54$, and in particular $0.15<V_f<0.50$ is preferred. Even more preferred is a fiber-metal laminate wherein the fiber volume fraction of the fiber-reinforced composite layers satisfies $0.20 \leq V_f \leq 0.45$ and most preferred is a fiber volume fraction of the fiber-reinforced composite layer satisfying $0.20 \leq V_f \leq 0.40$ for an optimal laminate which simultaneously satisfies fatigue requirements with good joint performance as well as high stiffness.

According to a further aspect of the invention a fiber-metal laminate is provided comprising a number of n mutually bonded and alternating fiber-reinforced composite layers and metal sheets. Preferred laminates comprise one or both outer layers of metal, or one or both outer layers of a fiber-reinforced composite. Particularly preferred is a three-layer fiber-metal laminate comprising two metal sheets and one fiber-reinforced composite layer, or, alternatively, one metal sheet and two fiber-reinforced composite layers.

Although the thickness of the metal sheets in the fiber-metal laminate of the invention may all be the same, according to an embodiment of the invention, a fiber-metal laminate is provided comprising metal sheets of different thicknesses whereby one or more of the metal sheets satisfies the relationships (1) to (3). A further embodiment of the invention provides a fiber-metal laminate, comprising metal sheets of different metal alloys. In accordance with another embodiment however, a fiber-metal laminate may be provided that comprises metal sheets of the same metal alloy.

In another aspect of the invention, a fiber-metal laminate is provided comprising fiber-reinforced composite layers of different thicknesses whereby one or more of the fiber-reinforced composite layers satisfies the relations (1) to (3). A preferred embodiment is one in which at least one of the fiber reinforced composite layers adjacent to the thickest metal layer fulfills the requirements of relations (1) to (3) together with said thickest metal layer. A fiber-metal laminate, comprising fiber-reinforced composite layers of different thicknesses between metal layers provides another useful embodiment.

The thickness of the metal sheet or sheets may be chosen within a large range as long as relations (1) to (3) are satisfied. A preferred embodiment of the fiber-metal laminates according to the invention comprises metal sheets having a thickness of $0.4 \text{ mm} < t_{metal} \leq 4 \text{ mm}$, since the effects of the invention are most apparent in this range. Even more preferred is an embodiment of the fiber-metal laminate wherein the thickness of the metal sheets is in the range of $0.5 \text{ mm} < t_{metal} \leq 2 \text{ mm}$.

In another aspect of the invention, a fiber-metal laminate is provided wherein the fibers in the fiber-reinforced composite layers extend in at least one direction (called UD) and the thickness of the metal sheets is below 1.5 mm.

In another aspect of the invention, a fiber-metal laminate is provided wherein the thickness of the metal sheets ranges between 0.5 mm and 4 mm, more preferably between 0.5 mm and 2 mm, and most preferably between 0.6 mm and 1.5 mm.

Still another embodiment in accordance with the invention provides a fiber-metal laminate wherein the fiber volume fraction of the fiber-reinforced composite layers satisfies $0.20 \leq V_f < 0.50$ and the thickness of the metal sheets is equal or below 2 mm.

Even more preferred is a fiber-metal laminate wherein the fiber volume fraction of the fiber-reinforced composite layers satisfies $0.30 \leq V_f < 0.50$ and the thickness of the metal sheets is equal or below 1.2 mm.

Although the metal of the metal sheets in the fiber-metal laminate may be chosen at will, in still another aspect of the invention, a fiber-metal laminate is provided wherein the metal of the metal sheets is selected from steel alloys, aluminum alloys, magnesium alloys and titanium alloys, whereby aluminum alloys, magnesium alloys and titanium alloys are particularly useful.

In a further preferred embodiment of the invention, a fiber-metal laminate is provided wherein the fiber-reinforced composite layers comprise glass, aramid, PBO, copolymer or carbon fibers, or combinations thereof. The fiber reinforced composite layers may comprise substantially continuous fibers that extend mainly in one direction and/or may comprise substantially continuous fibers that extend mainly in two perpendicular directions, such as in a cross ply in either 0°/90° and/or under angles with respect the 0° direction, like for instance +45°/−45° form or, for instance for aero-elastic tailoring, in a direction deviating from the 0° direction. Most preferred is a laminate in which the fibers in the composite layers are oriented in one direction, i.e. uni-directional. A woven fabric is excluded in a preferred embodiment of the invention.

A particularly preferred fiber-metal laminate according to the invention comprises a flat or curved doubler and an aluminum-lithium skin for a fuselage, wing or tailplane.

In yet another aspect of the invention, an assembly of a fiber-metal laminate according to anyone of the preceding claims and a further element, the further element being connected to the fiber-metal laminate by a bonding layer, comprising an adhesive and/or a fiber-reinforced composite, or being connected by mechanical fastening means. The further element preferably comprises a structural element and/or combinations of structural elements selected from a stiffener, such as an angle section, Z-stringer, hat stringer, C-stringer, Y-stringer; a spar(section), rib(section), shear-cleat and/or frame(section) of an aircraft structure.

In another aspect of the invention, the further element comprises a flat or tapered plate made from a metal, such as an aluminum alloy, magnesium alloy, titanium alloy and/or steel alloy and/or a combination of metal sheets and composite layers.

In still another aspect of the invention, an assembly of a fiber-metal laminate and a further element connected thereto is provided wherein the further element comprises at least one structural element selected from a stiffener, such as an angle section, Z-stringer, hat stringer, C-stringer, Y-stringer; a spar (section), rib (section), shear-cleat and/or frame (section) of an aircraft structure, or a combination thereof.

Still another aspect of the invention provides the use of such an assembly in providing a fatigue resistant structure.

DETAILED DESCRIPTION OF THE INVENTION

In the following description, reference is made to the accompanying drawings, which form a part hereof, and which show, by way of illustration, specific embodiments in which the invention may be practiced. The present invention, however, may be practiced without the specific details or with certain alternative equivalent methods to those described herein.

The basis of the present invention is a unique arrangement of fiber-reinforced composite layers and at least one metal sheet. In accordance with the invention a fiber-metal laminate is provided comprising fiber-reinforced composite layers and metal sheets, wherein the fiber properties relate to the metal sheet properties in a specific manner, as given by equations (1) to (3). The fiber-reinforced composite layers preferably comprise fibers pre-impregnated with a composite matrix system, preferably a metal adhesive (prepreg). The system of composite layers and metal sheets is preferably processed under heat and pressure to cure the adhesive and form a solid panel or component.

It has been discovered by the inventors that fiber-metal laminates with fiber properties according to equations (1) to (3) have better structural properties in joint strength as well as in fatigue, in particular a higher resistance against crack growth than fiber-metal laminates of which the relevant properties are not in accordance with relations (1) to (3). The parameters used in equations (1) to (3) are well known to the person skilled in the art and this person will have no difficulty in determining the properties mentioned. The invention is based on the insight that metal sheet thickness and fiber volume fraction of the fiber-reinforced composite layers are related in view of obtaining a high crack growth resistance.

Figure 8:
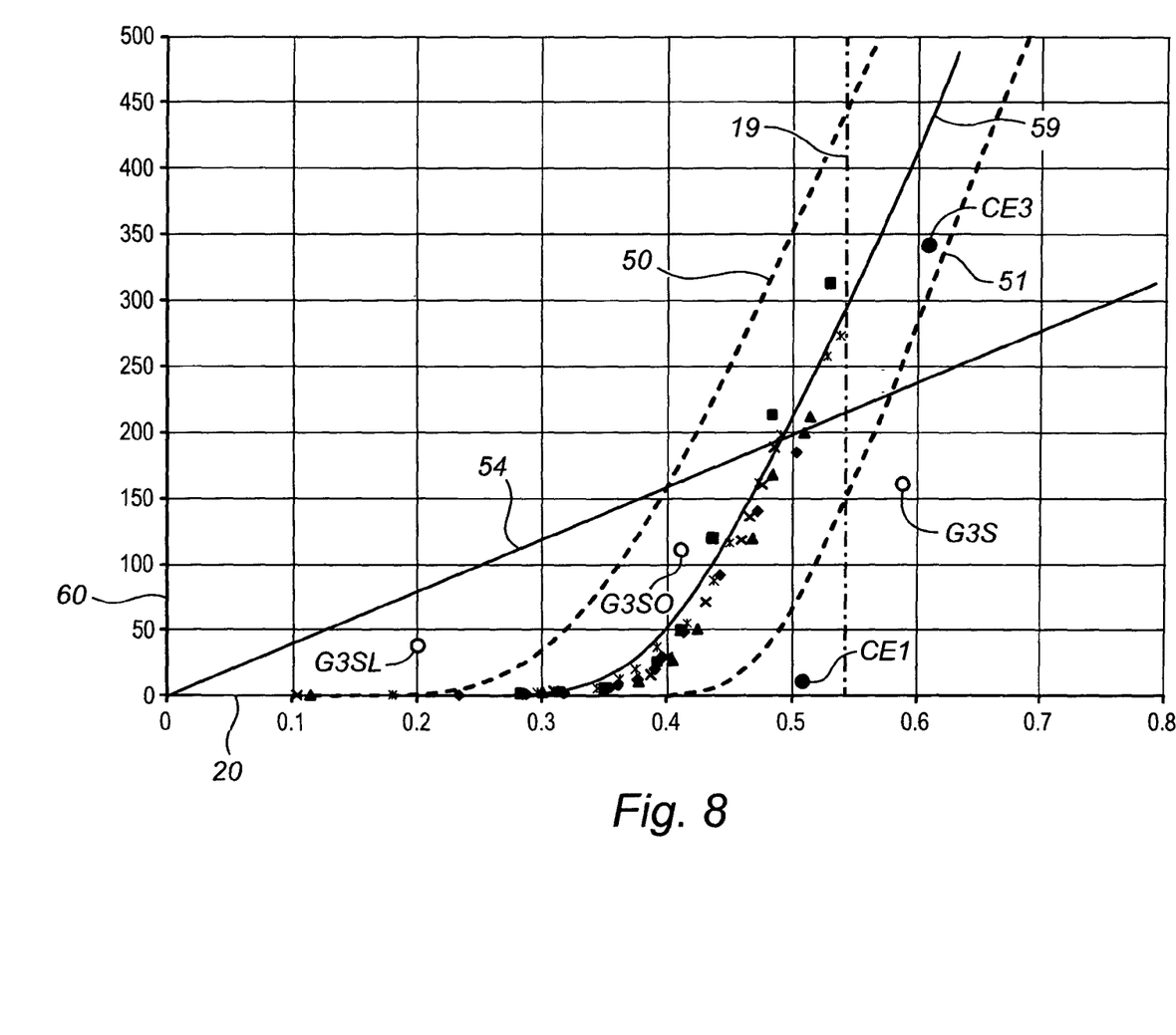
FIG. 8—illustrates the relationship between the parameters of claim 1 and fiber volume fraction of the fiber-reinforced composite layers for several embodiments of the fiber-reinforced laminate according to the invention.

The relation between the fiber volume fraction of the fiber-metal laminate and the stiffness and thickness of the metal sheets (equation (1)) in accordance with the invention is graphically shown in FIG. 8. Fiber-metal laminates according to several embodiments of the invention use fiber reinforced layers with a fiber volume fraction below 0.54, i.e. below the line 19 and between the lines 51 and 50. Line 50 represents the upper bound as given by $a=1200$ kN/mm$^4$; $b=0.88$; and $c=0$. Line 51 represents the lower bound as given by $a=1200$ kN/mm$^4$; $b=0.36$; and $c=0.3$. Line 20 represents the lower boundary for Vf<0.3 and line 54 represents the upper limit for the joint performance as given by 400*Vf kN/mm$^4$.

Figure 9:
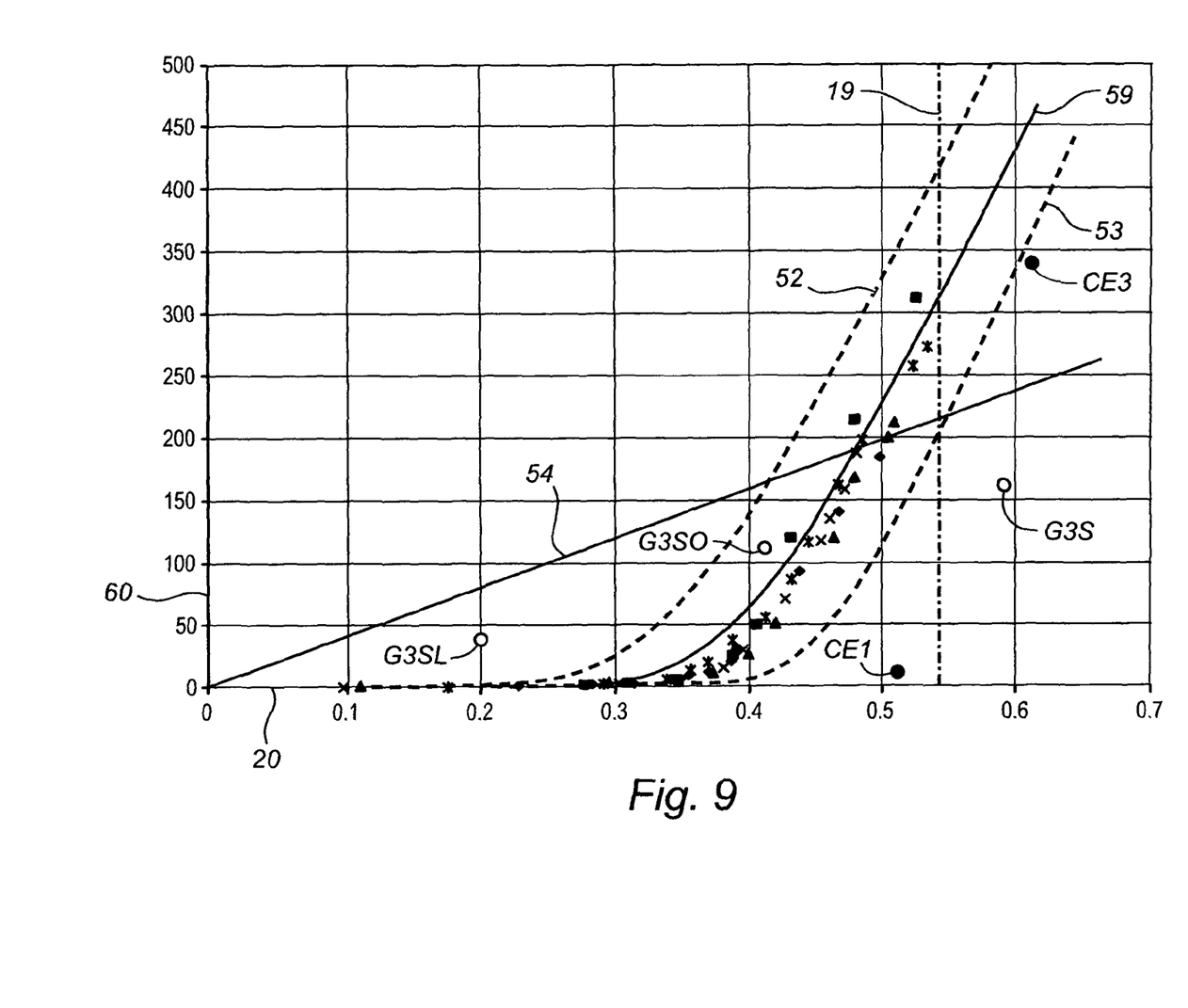
FIG. 9—illustrates the relationship between the parameters of claim 2 and fiber volume fraction of the fiber-reinforced composite layers for several other embodiments of the fiber-reinforced laminate according to the invention.

FIG. 9 graphically shows the relation between the fiber volume fraction of the fiber-metal laminate and the stiffness and thickness of the metal sheets (equation (1)) in accordance with another embodiment wherein line 52 represents the upper bound as given by $a=1200$ kN/mm$^4$; $b=0.85$; and $c=0.02$, whereas line 53 represents the lower bound as given by $a=1200$ kN/mm$^4$; $b=0.41$; and $c=0.26$. Fiber-metal laminates according to several embodiments of the invention use fiber reinforced layers with a fiber volume fraction below 0.54, i.e. below the line 19 and between the lines 53 and 52. Line 20 represents the lower boundary for Vf<0.26 and line 54 represents the upper limit for the joint performance as given by 400*Vf kN/mm$^4$.

The fiber-reinforced composite layers in the fiber-metal laminates according to the invention are light and strong and comprise reinforcing fibers embedded in a polymer. The polymer may also act as a bonding means between the various layers. Reinforcing fibers that are suitable for use in the fiber-reinforced composite layers depend on the choice of metal in the metal sheets (see equations (1) to (3)) but may include glass fibers, aramid fibers, PBO fibers, carbon fibers, copolymer fibres and metal fibers and/or combinations of the above fibers. Preferred fibers include reinforcing fibers with a relatively high tensile strength and/or stiffness, of which class high modulus fibers, such as carbon fibers, are particularly preferred. Preferred reinforcing fibers include copolymer fibers, such as those known as Copol® fibers and available from Teijin. Other preferred fibers will have a fiber stiffness of at least $E_{fiber}=80$ GPa, or more preferred of at least $E_{fiber}=85$ GPa and most preferred of at least $E_{fiber}=90$ GPa.

Examples of suitable matrix materials for the reinforcing fibers include but are not limited to thermoplastic polymers such as polyamides, polyimides, polyethersulphones, polyetheretherketone, polyurethanes, polyphenylene sulphides (PPS), polyamide-imides, polycarbonate, polyphenylene oxide blend (PPO), as well as mixtures and copolymers of one or more of the above polymers. Suitable matrix materials also comprise thermosetting polymers such as epoxies, unsaturated polyester resins, melamine/formaldehyde resins, phenol/formaldehyde resins, polyurethanes, of which thermosetting polymers epoxies are most preferred. In accordance with the invention, the fibrous composites comprise less than 54% by volume of fibers.

In the laminate according to the invention, the fiber-reinforced composite layer preferably comprises substantially continuous fibers that extend in multiple direction (like 0°, 90° and angles with respect to 0°) and possibly in two almost orthogonal directions (for instance cross plies). However it is even more preferable for the fiber-reinforced composite layer to comprise substantially continuous fibers that mainly extend in one direction (so called UD material). It is advantageous to use the fiber-reinforced composite layer in the form of a pre-impregnated semi-finished product. Such a "prepreg" shows generally good mechanical properties after curing thereof, among other reasons because the fibers have already been wetted in advance by the matrix polymer.

Fiber-metal laminates may be obtained by connecting a number of metal sheets and fiber-reinforced composite layers to each other by means of heating under pressure and subsequent cooling. The fiber-metal laminates of the invention have good specific mechanical properties (properties per unit of density). Metals that are particularly appropriate to use include steel (alloys) and light metals, such as aluminum alloys, magnesium alloys and in particular titanium alloys. Suitable aluminum alloys are based on alloying elements such as copper, zinc, magnesium, silicon, manganese, and lithium. Small quantities of chromium, titanium, scandium, zirconium, lead, bismuth and nickel may also be added, as well as iron. Suitable aluminum alloys include aluminum copper alloys (2xxx series), aluminum magnesium alloys (5xxx series), aluminum silicon magnesium alloys (6xxx series), aluminum zinc magnesium alloys (7xxx series), aluminum lithium alloys (8xxx series), as well as aluminum magnesium scandium alloys. Suitable titanium alloys include but are not limited to alloys comprising Ti-15V-3Cr-3Al-3Sn, Ti-15Mo-3Al-3Nb, Ti-3Al-8V-6Cr-4Zr-4Mo, Ti-13V-11Cr-3Al, Ti-6Al-4V and Ti-6Al-4V-2Sn. In other respects, the invention is not restricted to laminates using these metals, so that if desired other metals, for example copper or another suitable structural metal can be used. The laminate of the invention may also comprise metal sheets of different alloys.

A fiber-metal laminate according to the invention will generally be formed by a number of metal sheets and a number of fiber-reinforced composite layers, with the proviso that the properties of the fiber-reinforced composite layers and of the metal sheets satisfy equations (1) to (3).

The outer layers of the fiber-metal laminate may comprise metal sheets and/or fiber-reinforced composite layers. The number of metal layers may be varied over a large range and is at least one. In a particularly preferred fiber-metal laminate, the number of metal layers is two, three or four, between each of which fiber-reinforced composite layers have preferably been applied. Depending on the intended use and requirements set, the optimum number of metal sheets can easily be determined by the person skilled in the art. The total number of metal sheets will generally not exceed 40, although the invention is not restricted to laminates with a maximum number of metal layers such as this. According to the invention, the number of metal sheets is preferably between 1 and 30, and more preferably between 1 and 10, with the metal sheets preferably having a tensile ultimate strength of at least 0.25 GPa.

To prevent the laminate from warping as a result of internal tensions, the laminate according to the invention can be structured symmetrically with respect to a plane through the center of the thickness of the laminate.

Fiber-metal laminate configurations according to the invention are readily obtained by arranging (alternating) layers of fiber-reinforced composite, preferably in the form of prepregs, and at least one metal sheet. The fiber-metal laminates can be designed in many different arrangements.

Figure 1:
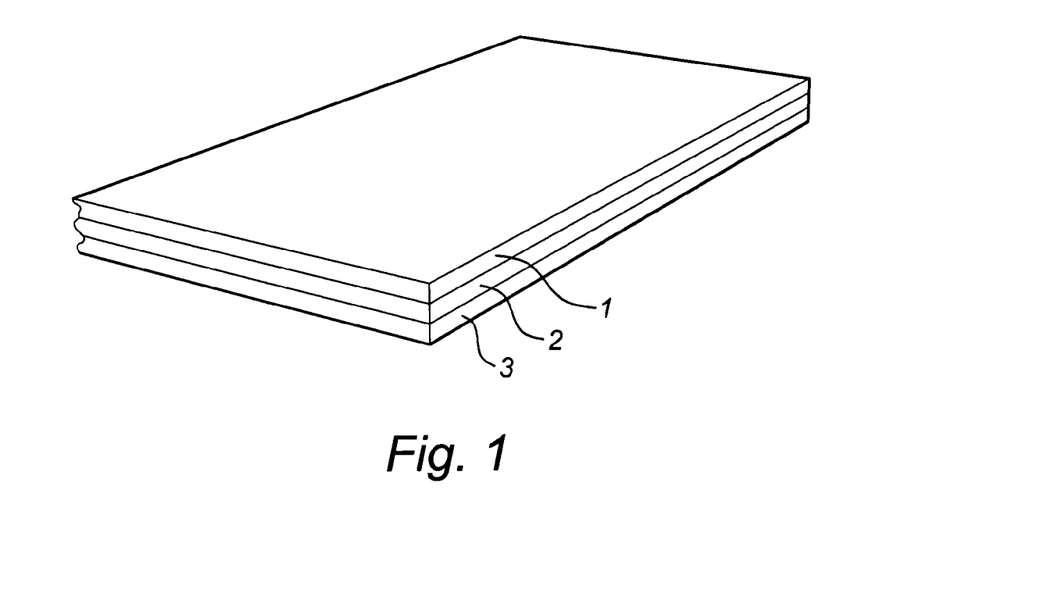
FIG. 1—is a view in perspective of a fiber-metal laminate according to an embodiment of the present invention.

With reference to FIG. 1, a fiber-metal laminate according to one embodiment is shown, wherein the total number of layers is 3, and wherein layer 1 and layer 3 comprise a metal layer and layer 2 a fibrous composite layer. Alternatively, layer 1 and layer 3 comprise a fibrous composite layer and layer 2 is a metal layer. Layer 1 and layer 3 can comprise the same metal or may be a different kind of metal. The fibrous composite layer(s) may contain fibers in multiple directions as well as different kind of fibers for which at least one of the fiber types in at least one of the fibrous composite layer(s) fulfill the requirements set in equations (1) to (3).

Figure 2:
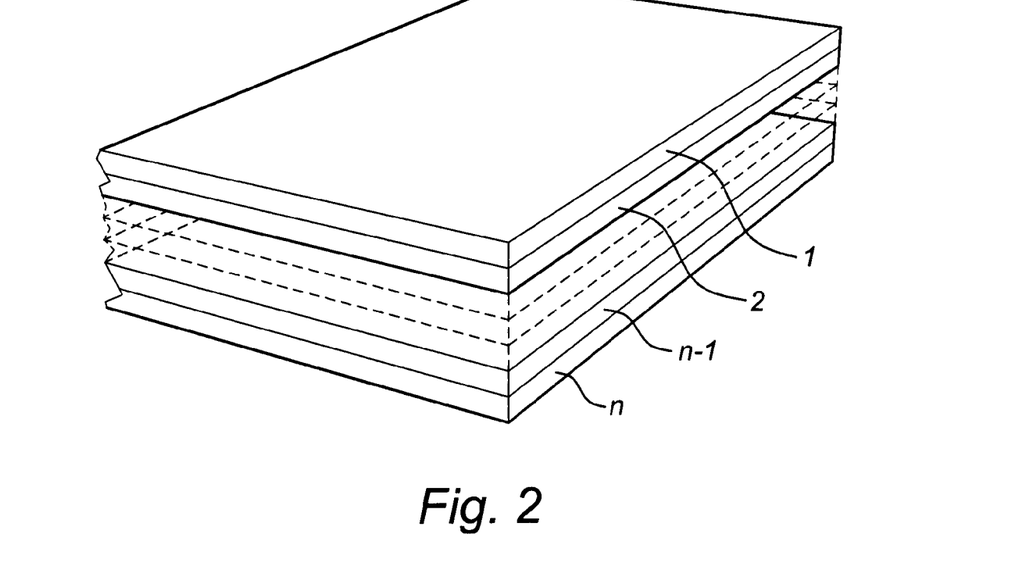
FIG. 2—is a view in perspective of a fiber-metal laminate according to another embodiment of the present invention.

With reference to FIG. 2, a fiber-metal laminate according to another embodiment is shown, wherein the total number of layers is n, and wherein layer 1 is a metal layer and layer 2 is a fibrous composite layer, which will be alternating until layer n−1 and layer n.

Alternatively, layer 1 is a fibrous composite layer and layer 2 is a metal layer, which will be alternating until layer n−1 and layer n. The alternating metal layers can be of the same metal or be a different kind of metal, and can have different thicknesses. Also, at least one of the alternating fibrous composite layers may contain fibers in multiple directions as well as different kind of fibers, for which at least one of the fiber types in at least one of the fibrous composite layer fulfills the requirements set in equations (1) to (3) with respect to the adjacent metal layer, preferably with the largest metal thickness. According to the invention, at least one combination of a fiber-reinforced composite layer (for instance layer 2) and an adjacent metal sheet (for instance layer 1 or 3) needs to satisfy relations (1) to (3) in which $E_{lam}$ corresponds to the tensile Young's modulus in $kN/mm^2$ of the total fiber-metal laminate comprising all layers 1, 2, . . . , n−1, n. In case metal layers (1) and (3) differ in thickness, the thickest metal layer is preferably selected in the combination. In case the outer layer of the laminate is a fibrous composite layer, this layer preferably needs to fulfill the requirements set in equations (1) to (3) with respect to its adjacent metal layer, unless another metal layer with its adjacent fibers composite layer already fulfills the requirements. If the outer layer is metal, it preferably needs to fulfill the requirements set in equations (1) to (3) with respect to its adjacent fibrous composite layer, unless another metal layer with its adjacent fibrous composite layer already fulfills the requirements.

The laminates are produced by preparing a stack of fibrous composite and metal sheets in the sequence as exemplified in FIGS. 1 and 2, for example on a flat or single, double or multiple curved mold. After lamination, the overall structure is cured at a temperature suitable for the matrix resin, preferably an epoxy resin, for instance in an autoclave, and preferably under vacuum in order to expel entrapped air from the laminate. For most applications, an epoxy resin with a high glass transition temperature will be most suitable. Any epoxy resin may be used however. Epoxy resins are generally cured at or slightly above room temperature, at a temperature of approximately 125° C. or at a temperature of approximately 175° C. After curing under pressure a consolidated laminate is obtained. As mentioned above, it is also possible to use a thermoplastic resin.

Another preferred production of a laminate in accordance with the invention comprises more than one curing cycle. With reference to FIG. 2, a laminate can for instance be produced by first making a laminate containing layers 3 up to n−2 in a dedicated cure cycle, and then, in a second adjusted cure cycle, connect to this laminate two metal layers 1 and n by means of a fiber-reinforced composite layer (2 and n−1) on each side with an appropriate fiber volume content meeting the requirements of equations (1)-(3).

EXAMPLES AND COMPARATIVE EXAMPLES

The invention will be illustrated by several Examples. The Examples are compared to some known laminates, i.e. laminates falling outside the area bound by lines 19, 50, 51, 54 and 20 for a laminate according to the invention, and by lines 19, 52, 53, 54 and 20 for a laminate according to a preferred embodiment, see FIG. 8 and FIG. 9.

Examples

The investigated laminates are referred to as:

FML-G-A-UD-4/3: a S2 glass fiber reinforced FML having unidirectional fibers in the fiber-reinforced composite layers oriented in the load direction and an aluminum 2024-T3 alloy as metal in the metal sheets;

FML-C-A-UD-4/3: a high strength carbon fiber reinforced FML having unidirectional fibers in the fiber-reinforced composite layers oriented in the load direction and an aluminum 2024-T3 alloy as metal in the metal sheets;

FML-C-T-UD-4/3: a high strength (HS) carbon fiber reinforced FML having unidirectional fibers in the fiber-reinforced composite layers oriented in the load direction and a titanium Ti-6Al-4V alloy as metal in the metal sheets;

FML-I-T-UD-4/3: an intermediate modulus (IM) fiber (with stiffness in between high performance glass fibers and high modulus carbon fibers) reinforced FML having unidirectional fibers in the fiber-reinforced composite layers oriented in the load direction and a titanium Ti-6Al-4V alloy as metal in the metal sheets; and FML-G-A-CP-4/3: a S2 glass fiber reinforced FML having cross plies in the fiber-reinforced composite layers mainly oriented in the metal rolling direction and an aluminum 2024-T3 alloy as metal in the metal sheets.

All analyzed laminates comprise 4 metal sheets and 3 fiber-reinforced composite layers interspersed with the metal sheets. To be able to compare correctly, each grade of laminate (i.e. having the same metal and fibers) with the same metal thickness has about the same weight and a running load corresponding with a stress of 100 MPa taken at $V_f=0.57$.

An analysis method was developed based on numerous fatigue tests for specimens with a starter notch of 5 mm whereby fatigue life was defined as the number of cycles needed to obtain a metal crack length of 20 mm.

Results are provided in FIGS. 3-7 for all laminates at different metal sheet thicknesses and fiber volume fraction in the fiber-reinforced layers.

Figure 3:
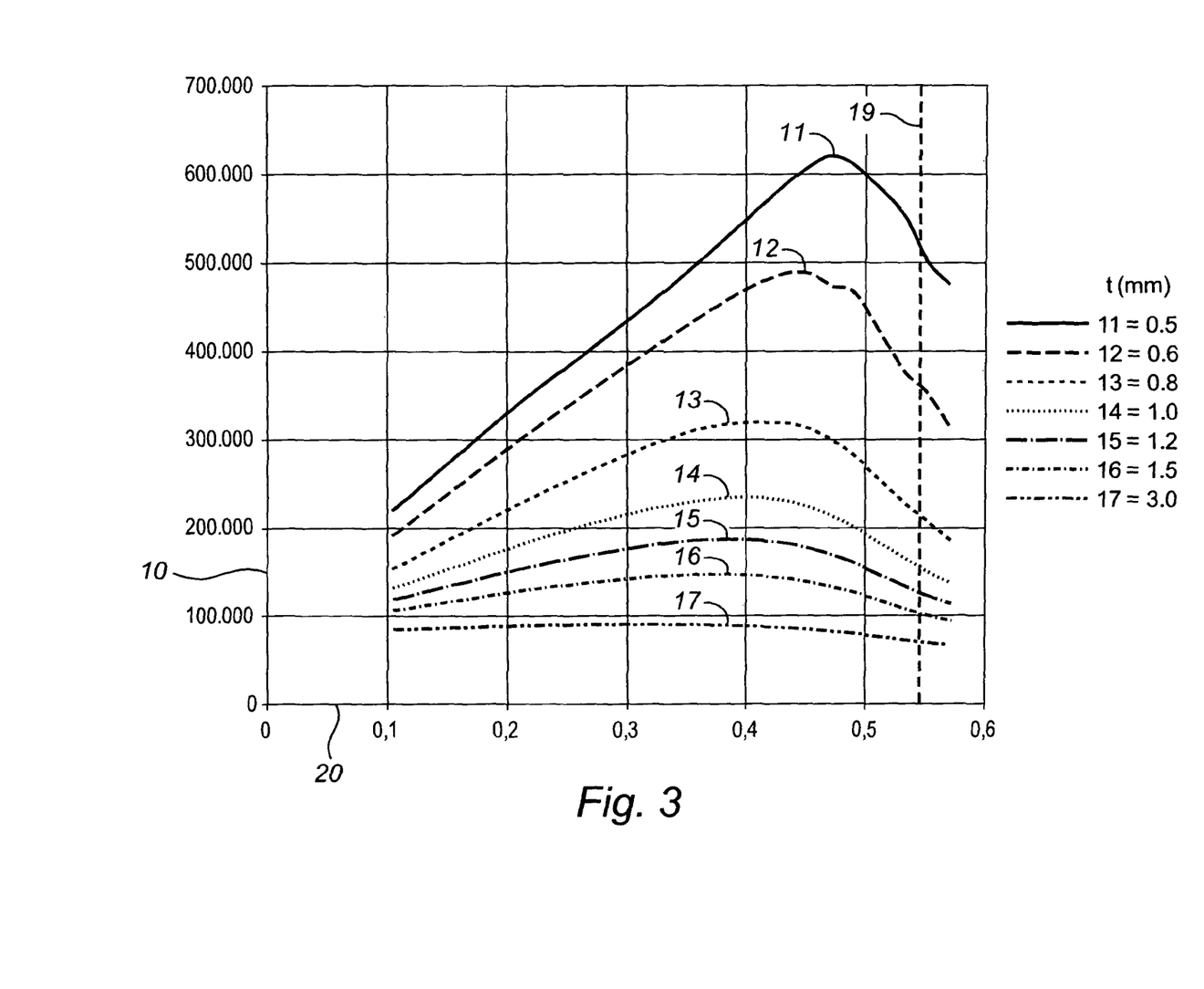
FIGS. 3-7—illustrate the relationship between fatigue life and fiber volume fraction of the fiber-reinforced composite layers in several embodiments of the fiber-reinforced laminate according to the invention.

FIG. 3 shows the notched fatigue life 10 in terms of the number of dynamic loading cycles against the fiber volume fraction 20 for a FML-G-A-UD-4/3 FML with different metal sheet thicknesses. The curves 11, 12, 13, 14, 15, 16 and 17 are for metal sheet thicknesses of 0.5 mm, 0.6 mm, 0.8 mm, 1.0 mm, 1.2 mm, 1.5 mm, and 3.0 mm respectively. Line 19 corresponds to $V_f=0.54$.

Figure 4:
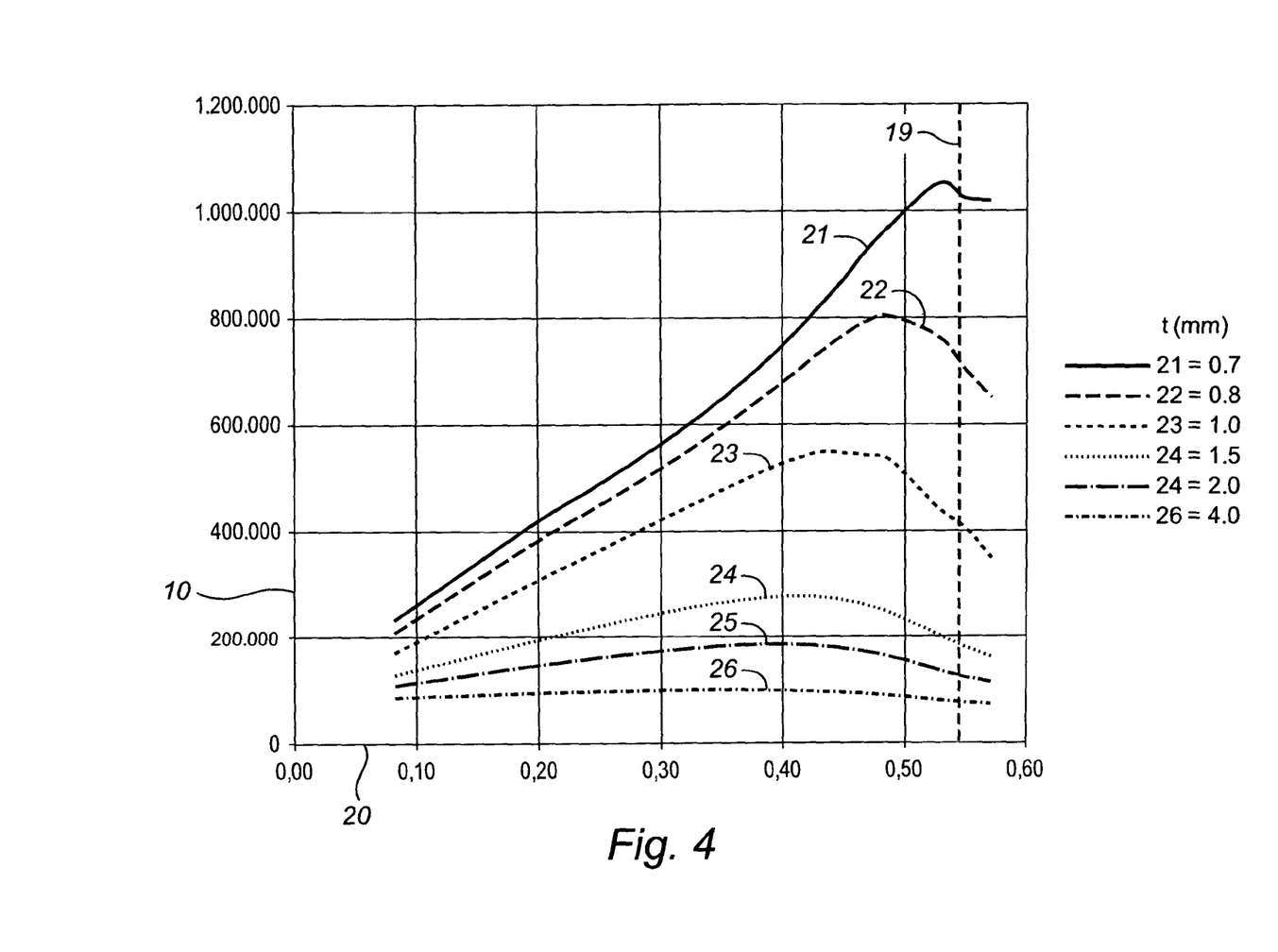

FIG. 4 shows the notched fatigue life 10 in terms of the number of dynamic loading cycles against the fiber volume fraction 20 for a FML-C-A-UD-4/3 FML with different metal sheet thicknesses. The curves 21, 22, 23, 24, 25 and 26 are for metal sheet thicknesses of 0.7 mm, 0.8 mm, 1.0 mm, 1.5 mm, 2.0 mm and 4.0 mm respectively. Line 19 corresponds to $V_f=0.54$.

Figure 5:
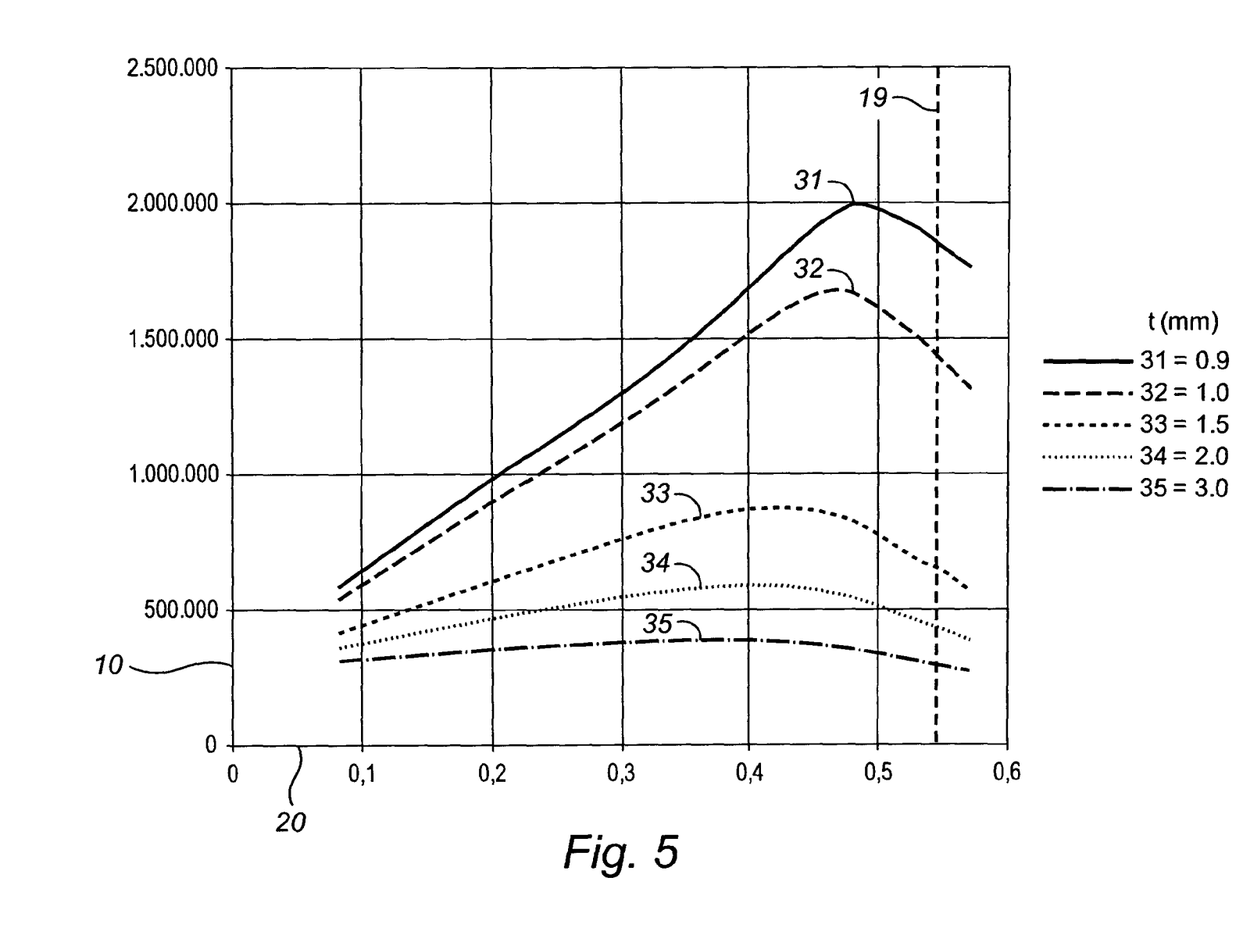

FIG. 5 shows the notched fatigue life 10 in terms of the number of dynamic loading cycles against the fiber volume fraction 20 for a FML-C-T-UD-4/3 FML with different metal sheet thicknesses. The curves 31, 32, 33, 34 and 35 are for metal sheet thicknesses of 0.9 mm, 1.0 mm, 1.5 mm, 2.0 mm and 3.0 mm respectively. Line 19 corresponds to $V_f=0.54$.

Figure 6:
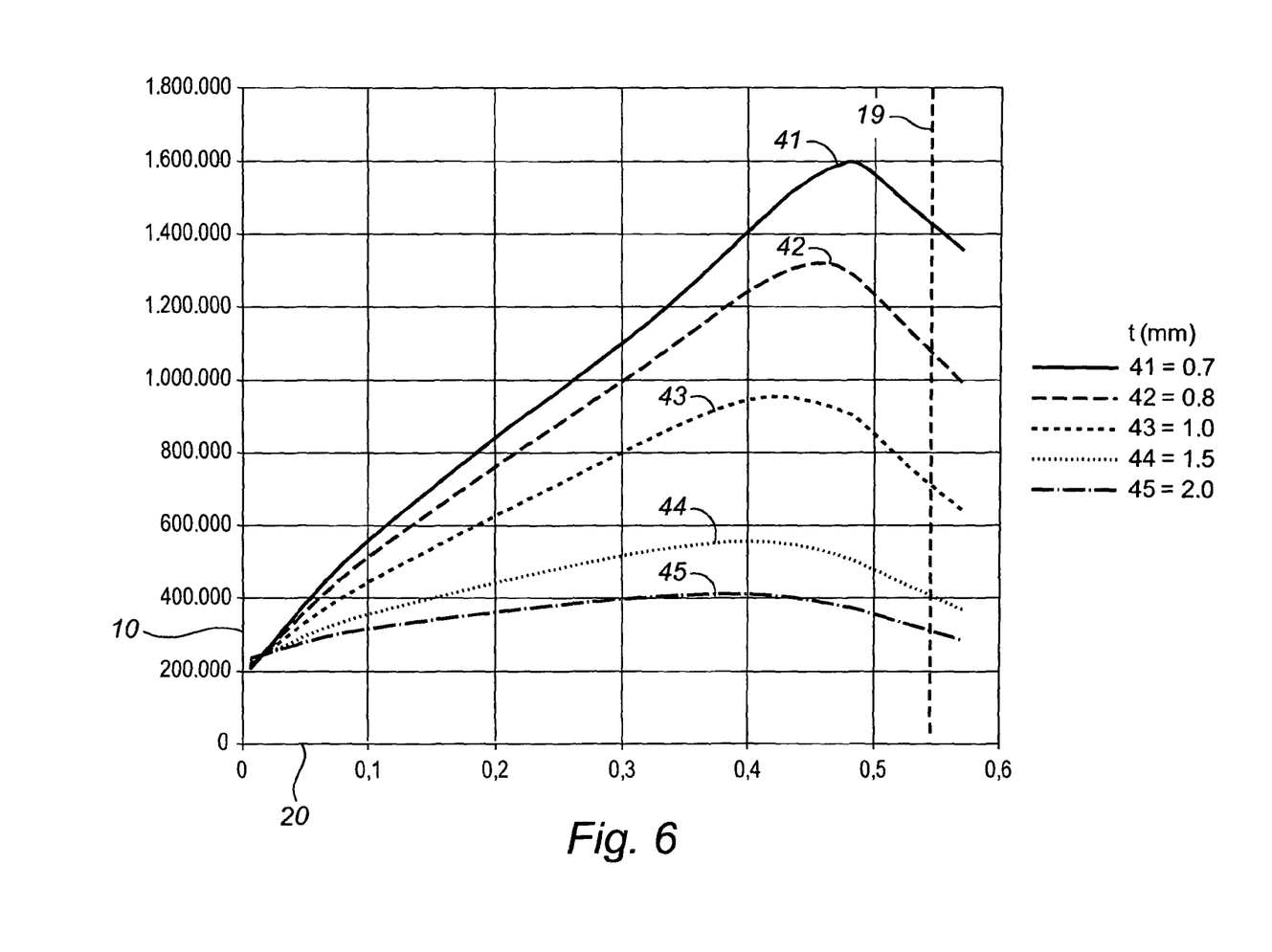

FIG. 6 shows the notched fatigue life 10 in terms of the number of dynamic loading cycles against the fiber volume fraction 20 for a FML-I-T-UD-4/3 FML with different metal sheet thicknesses. The curves 41, 42, 43, 44 and 45 are for metal sheet thicknesses of 0.7 mm, 0.8 mm, 1.0 mm, 1.5 mm and 2.0 mm respectively. Line 19 corresponds to $V_f=0.54$.

Figure 7:
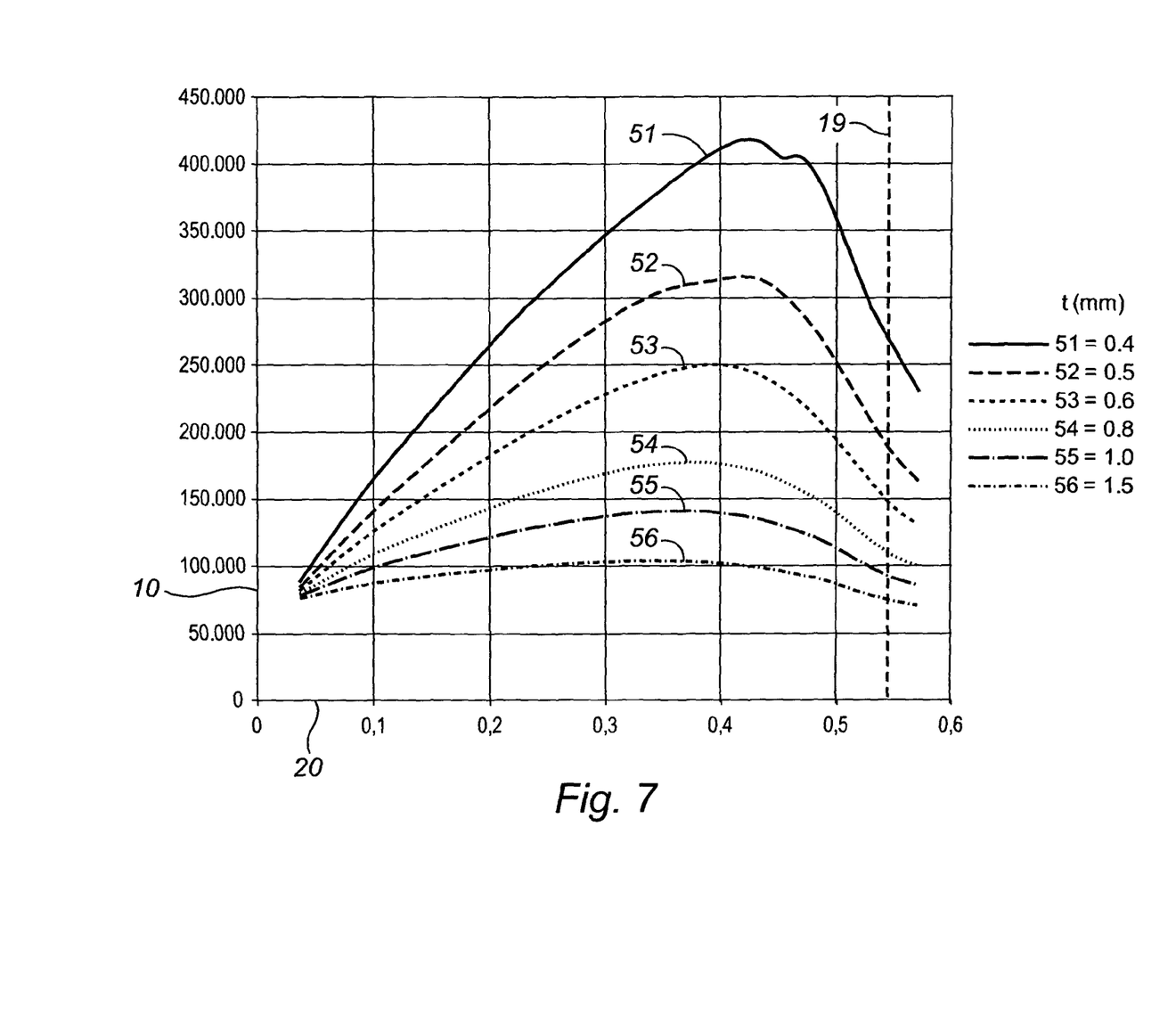

FIG. 7 finally shows the notched fatigue life 10 in terms of the number of dynamic loading cycles against the fiber volume fraction 20 for a FML-G-A-CP-4/3 FML with different metal sheet thicknesses. The curves 51, 52, 53, 54, 55 and 56 are for metal sheet thicknesses of 0.4 mm, 0.5 mm, 0.6 mm, 0.8 mm, 1.0 mm and 1.5 mm respectively. Line 19 corresponds to $V_f=0.54$.

All results show an optimum $V_f$ for each metal sheet thickness, whereby the optimum shifts to lower $V_f$ for FML with thicker metal sheets. The optimum corresponds to the maximum value of the number of fatigue life (cycles) 10. Also shown is that a too low $V_f$ yields less optimal fatigue performance. A minimum value for Vf is therefore part of the invention.

The FML showing a maximum value of fatigue life (the maxima in FIGS. 3-7) were selected and grouped in FIGS. 8 and 9. The maximum values follow the line 59, as indicated in FIGS. 8 and 9. The optimum lines corresponds with b=0.58 and c=0.15, and with 0 (zero) for $V_f<0.15$. These figures show the parameter $60=E_{lam}*E_{comp}/(E_{metal}*t_{metal}^2)$ in kN/mm⁴ against the fiber volume fraction 20. These figures also graphically represent relations (1) to (3) whereby dotted line 50 and 51 in FIG. 8 represents resp. the upper and lower bounds of relation (1), corresponding to 90% of the maximum fatigue performances of the laminates. Dotted lines 50 and 51 and line 54 represent the boundaries defined by claim 1. Laminates corresponding to the invention lie within the area bounded by lines 50, 19, 51, 54 and 20 (for Vf≤0.3). FIG. 9 represents a tighter upper and lower bound of relation (1) i.e. resp. dotted line 52 and 53, corresponding to 95% of the maximum fatigue performances of the laminates. Dotted lines 52, 53 and line 54 represent the boundaries defined by claim 2. Laminates according to this preferred embodiment lie within the area bounded by lines 54, 52, 19, 53 and 20 (for Vf≤0.26).

Optimum fiber-metal laminates, i.e. FML having the highest crack resistance under dynamic loading are all situated within the boundaries defines by dotted lines 50, 51 and line 19, which represents relation (2) and line 54 which represents relation (3). Preferred embodiments as defined in claim 2 are all situated within the boundaries defines by dotted lines 52, 53, line 54 and line 19. Non-optimum fiber-metal laminates which are outside the scope of the present invention fall outside the area bound by dotted lines 50, 51 (or 52, 53), line 54 and line 19.

COMPARATIVE EXAMPLES

Comparative Example 1

In EP 0322947B1 two laminates are described in sufficient detail to allow calculating the results of equations (1)-(3) in accordance with the invention.

Laminate 1 (defined by ARALL1) comprises 14 sheets of aluminum alloy 7075-T6 each having $t_{metal}=0.3$ mm. Between each metal layer an aramid prepreg with a thickness of 0.2 mm and a $V_f=50\%$ is applied.

Laminate 2 consist of an aluminum alloy 2024-T3 sheet with thickness $t_{metal}=4$ mm, sandwiched between two ARALL 1 sheets which contain 3 aluminum alloy 7075-T6 sheets with thickness $t_{metal}=0.3$ mm. Between each metal sheet of the ARALL1, and between ARALL 1 and the inner 2024-T3 alloy sheet is applied an aramid prepreg with a thickness of 0.2 mm and a $V_f=50\%$.

Although the Young's modulus of the applied aluminum alloys is not disclosed in EP 0322947B1, this Young's modulus has been taken from MMPDS (DOT/FAA/AR- MMPDS-01), which gives for a 2024-T3 aluminum alloy $E_{metal}$=72.4 GPa and for a 7075-T6 aluminum alloy $E_{metal}$=71.0 GPa. The modulus of elasticity or Young's modulus of the aramid fibres is also not explicitly disclosed in EP 0 322 947 B1. It will therefore be assumed that the applied aramid fibre has a modulus $E_{fibre}$=125 GPa. To calculate the stiffness $E_{comp}$ of the composite layers, it is required to know the stiffness of the applied matrix system, which is not explicitly disclosed in EP 0 322 947. It will be assumed that the stiffness of the matrix system is 4 GPa.

Although the thickness of the aramid prepreg is disclosed in EP 0322947B1 (0.2 mm) it is not clear whether this is the thickness before or after the autoclave curing process. It is therefore assumed that the mentioned thickness corresponds to the cured prepreg thickness.

Applying all explicitly disclosed and reasonably assumed property data of EP 0322947 B1 in equation (1) results for laminate 1 in a value of 695 N/mm$^4$ and for laminate 2 in a value of 4 N/mm$^4$. Consequently laminate 1 is above the claimed optimum area, while laminate 2 is below the claimed area. The latter value is shown in FIGS. 8 and 9 as data point CE1.

Comparative Example 2

In WO 2007/145512 A1 on page 16, three combined laminates of a GLARE inner laminate sandwiched between thick aluminum layers are described.

Laminate 1 consists of a GLARE1-5/4-0.4 inner laminate with on both sides an aluminum 2024-T3 sheet with a thickness of 4 mm bonded to it with an adhesive film (no fibres).

Laminate 2 is similar to laminate 1, but differs only in the applied adhesive between the GLARE and the 4 mm aluminum outer sheets. Instead of an adhesive film standard $S_2$-glass prepreg was applied.

Laminate 3 is similar to the previous laminates with the only difference that instead of standard prepreg between GLARE and the outer 4 mm thick metal, standard prepreg together with adhesive film was applied. The fibre volume content of the standard $S_2$-glass prepreg is $V_f$=60% (page 16), which is outside the claimed area of the current invention. Consequently laminate 1 and 2 will fall outside the area claimed by the invention.

In addition it has to be mentioned that the thickness of the applied $S_2$-glass prepreg(s) nor its stiffness are disclosed, nor the thickness of the applied adhesive and its stiffness, nor the thickness, fibre volume content $V_f$ or the stiffness of the composite layer between the GLARE laminate and the 4 mm thick outer aluminum layers. Consequently it cannot be established whether equations (1)-(3) in accordance with the invention are satisfied by laminate 3 of WO 2007/145512 A1.

Comparative Example 3

WO 2009/095381 A1 at page 11 discloses a laminate of two aluminum 2024-T3 sheets with a thickness of about 0.2 mm, between which are disposed 8 fiber-reinforced layers. The fiber reinforced layers comprise UD $S_2$-glass fibers having $V_f$=60% and each layer has a thickness of 0.25 mm.

In order to be able to calculate the values according to equations (1)-(3), property data are needed that are not explicitly disclosed in WO 2009/095381 A1. In particular the stiffness of the fibre reinforced layers, and the stiffness of the metal are lacking. Using for the glass fibre $E_{fibre}$=88.5 GPa, and the same values as mentioned before for the fiber-reinforced composite matrix material and aluminum stiffness, i.e., $E_{matrix}$=4 GPa and $E_{metal}$=72.3 GPa, as well as making the same assumption as for the previous examples with respect to the composite layer thickness, calculation of the value of equation (1) results in 345 N/mm$^4$. This value is shown in FIGS. 8 and 9 as data point CE3. The laminate of WO 2009/095381 A1 does not show optimum fatigue properties and it is clear that this laminate is outside the claimed area.

Figure 10:
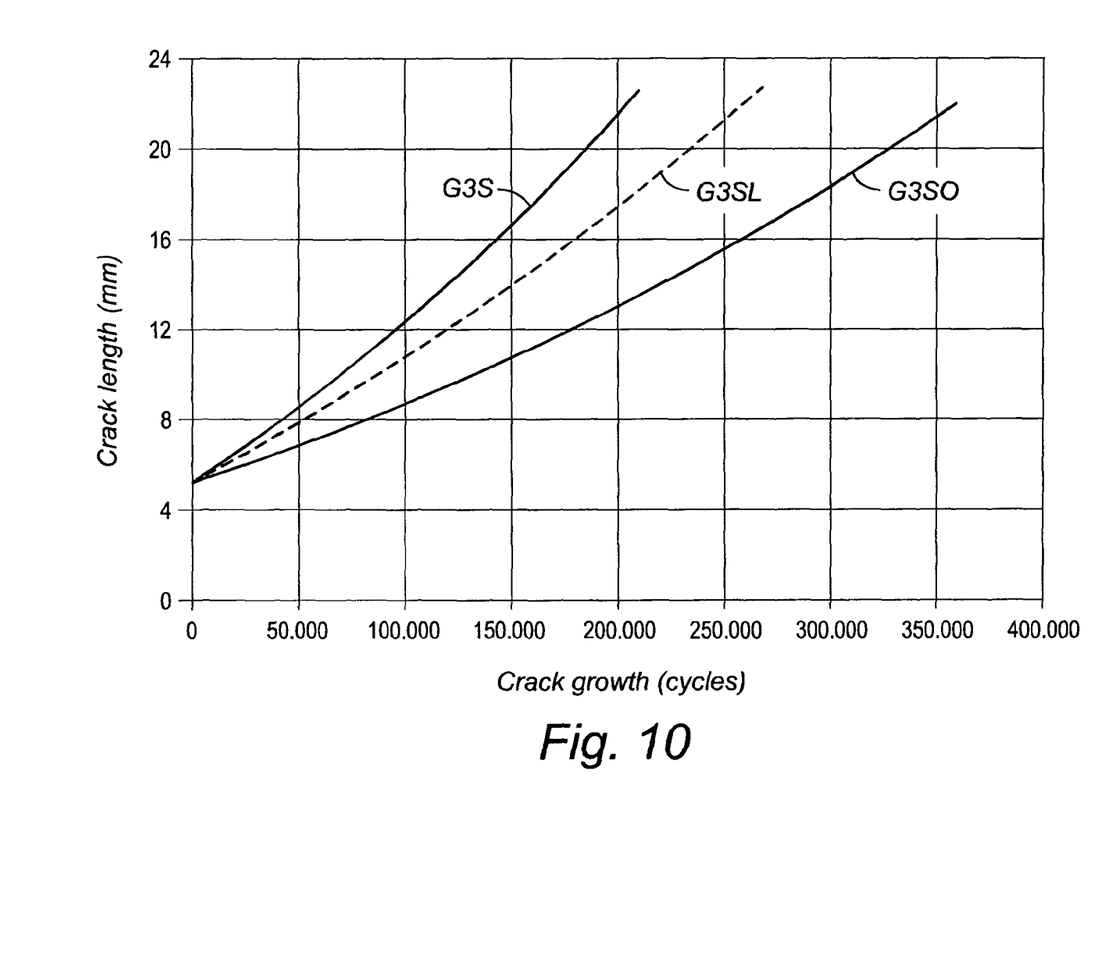
FIG. 10—illustrates the fatigue behavior of fiber-reinforced laminates with different fiber volume fractions, as measured by crack-growth under cyclic loading for different crack-lengths.

FIG. 10 shows the fatigue behavior of fiber-reinforced laminates with different fiber volume fractions, as measured by crack-growth under cyclic loading for different crack-lengths. The known fiber-reinforced laminate is so-called GLARE3-4/3-0.5, having aluminum layers with a thickness of 0.5 mm. The results for these laminates should therefore be compared with line 52 of FIG. 7 (same metal thickness). FIG. 10 shows clearly that the known GLARE3-4/3-0.5 laminate using standard prepreg (G3S) has a fatigue life of 185,000 cycles at a crack length of 20 mm. The standard prepreg has a nominal fiber volume fraction of about 58%. The value of the parameter $60 = E_{lam} * E_{comp}/(E_{metal} * t_{metal}^2)$ for the known GLARE3-4/3-0.5 laminate using standard prepreg (G3S) equals 162 kN/mm$^4$.

A laminate according to the invention (G3SO) has the same configuration as G3S but differs in that an additional adhesive layer has been added to the prepreg layer. The fatigue results of this laminate (with a volume fraction of about 42.5%) is shown in FIG. 10 as well and shows a fatigue life of about 330,000 cycles, which is almost a factor of 2 higher than the known laminate. In FIG. 7, the data point for laminate G3SO would be situated close to the top of line 52. The value of the parameter $60 = E_{lam} * E_{comp}/(E_{metal} * t_{metal}^2)$ for a laminate using G3SO prepreg equals 110 kN/mm$^4$. According to the invention, there is an optimum in fatigue behavior since by further reducing the fiber volume fraction, the fatigue performance will decrease again. Indeed, laminate G3SL has the same lay-up as the previous laminates G3S and G3SO but a further reduced fiber volume fraction of approximately 20%. The value of the parameter $60 = E_{lam} * E_{comp}/(E_{metal} * t_{metal}^2)$ for a laminate using G3SL prepreg equals 40 kN/mm$^4$. The G3SL laminate shows a reduced fatigue life of about 230,000 cycles (FIG. 10). The results obtained for these laminates are also shown in FIG. 8. This figure clearly shows that the claimed area between lines 50, 51 and 54 shows optimum fatigue performance since the laminate using G3SO prepreg, as well as the maxima of the notched fatigue life's shown in FIGS. 3-7 all fall within this area. Known laminates using prepreg such as G3SL and G3S are outside the area of invention, i.e. below the lower bound (line 51) for the laminate using G3S prepreg and above the upper bound (line 50) for a laminate using G3SL prepreg.

The invention claimed is:

1. A fiber-metal laminate of mutually bonded fiber-reinforced composite layers and metal sheets, the laminate comprising a combination of a fiber-reinforced composite layer and a directly adjacent metal sheet, in which combination the properties satisfy the following relations:

$E_{lam} * E_{comp}/(E_{metal} * t_{metal}^2)$ has a value between a lower bound value given by $$a*(Vf-c)^{(b/(Vf-c))} \text{ with } b=0.36 \text{ and } c=0.3 \qquad (1a)$$

and an upper bound value given by $$a*(Vf-c)^{(b/(Vf-c))} \text{ with } b=0.88 \text{ and } c=0 \tag{1b}$$

$$0.40 \leq Vf < 0.54 \tag{2}$$

$$0 < E_{lam}*E_{comp}/(E_{metal}*t_{metal}^2) < 400*Vf \text{ kN/mm}^4 \tag{3}$$

wherein a=1200 kN/mm$^4$; and $E_{comp}$=tensile Young's modulus of the fiber-reinforced composite layer in kN/mm$^2$ in the combination, taken in the direction of highest stiffness of the composite layer $E_{lam}$=tensile Young's modulus of the total fiber-metal laminate in kN/mm$^2$, taken in the same direction as for $E_{comp}$ $E_{metal}$=tensile Young's modulus of the metal sheet in kN/mm$^2$ in the combination $t_{metal}$=thickness of the metal sheet in mm in the combination $V_f$=fiber volume fraction of the fiber-reinforced composite layer in the combination.

2. The fiber-metal laminate according to claim 1, wherein a=1200 kN/mm$^4$; the lower bound parameter b=0.41 and c=0.26; and the upper bound parameter b=0.85 and c=0.02, wherein $E_{lam}*E_{comp}/(E_{metal}*t_{metal}^2)<400*Vf$ kN/mm$^4$.

3. The fiber-metal laminate according to claim 1, wherein the fiber volume fraction of the fiber-reinforced composite layer satisfies 0.40≤Vf<0.50.

4. The fiber-metal laminate according to claim 1, comprising fiber-reinforced composite layers of different thicknesses, and/or comprising a fiber-reinforced composite layer with at least two different fibers, and/or comprising fiber-reinforced composite layers that differ in fiber.

5. The fiber-metal laminate according to claim 1, wherein the thickness of the metal sheets is 0.4 mm<$t_{metal}$≤4 mm.

6. The fiber-metal laminate according to claim 1, wherein the fibers in the fiber-reinforced composite layers extend in multiple different directions.

7. The fiber-metal laminate according to claim 1, wherein the fiber volume fraction of the fiber-reinforced composite layers satisfies 0.40≤Vf<0.50 and the thickness of the metal sheets is 0.4 mm<$t_{metal}$≤2 mm.

8. The fiber-metal laminate according to claim 1, the laminate comprising a flat or curved doubler.

9. An assembly of a fiber-metal laminate according to claim 1 and a further element, the further element being connected to the fiber-metal laminate by a bonding layer, comprising an adhesive and/or a fiber-reinforced composite, or being connected by mechanical fastening means.

10. A fatigue resistant structure comprising an assembly according to claim 9.

11. A method for obtaining the metal sheet thickness and fiber volume fraction of the fiber-reinforced composite layers in a fiber-metal laminate comprising mutually bonded fiber-reinforced composite layers and metal sheets in order to obtain optimum fatigue properties of the fiber-metal laminate, the method comprising selecting a combination of a fiber-reinforced composite layer and a directly adjacent metal sheet, selecting one of the metal sheet thickness or fiber volume fraction, and calculating the corresponding fiber volume fraction or metal sheet thickness that satisfies the following relations:

$E_{lam}*E_{comp}/(E_{metal}*t_{metal}^2)$ has a value between a lower bound value given by $$a*(Vf-c)^{(b/(Vf-c))} \text{ with } b=0.36 \text{ and } c=0.3 \tag{1a}$$

and an upper bound value given by $$a*(Vf-c)^{(b/(Vf-c))} \text{ with } b=0.88 \text{ and } c=1 \tag{1b}$$

$$0.40 \leq Vf < 0.54 \tag{2}$$

$$E_{lam}*E_{comp}/(E_{metal}*t_{metal}^2)<400*Vf \text{ kN/mm}^4 \tag{3}$$

wherein a=1200 kN/mm$^4$; and $E_{comp}$=tensile Young's modulus of the fiber-reinforced composite layer in kN/mm$^2$ in the combination, taken in the direction of highest stiffness of the composite layer $E_{lam}$=tensile Young's modulus of the total fiber-metal laminate in kN/mm$^2$, taken in the same direction as $E_{comp}$ $E_{metal}$=tensile Young's modulus of the metal sheet in kN/mm$^2$ in the combination $t_{metal}$=thickness of the metal sheet in mm in the combination $V_f$=fiber volume fraction of the fiber-reinforced composite layer in the combination.

12. The method according to claim 11, wherein a=1200 kN/mm4; the lower bound parameter b=0.41 and c=0.26; and the upper bound parameter b=0.85 and c=0.02.

13. The method according to claim 11, comprising fiber-reinforced composite layers of different thicknesses between metal layers.

14. The method according to claim 11, wherein the thickness of the metal sheets is below 4 mm.

15. The method according to claim 11, wherein the fiber volume fraction of the fiber-reinforced composite layers satisfies 0.40≤Vf<0.50 and the thickness of the metal sheets is 0.4 mm<$t_{metal}$≤2 mm.

16. The fiber-metal laminate according to claim 2, wherein $E_{lam}*E_{comp}/(E_{metal}*t_{metal})<300*Vf$ kN/mm$^4$.

17. The fiber-metal laminate according to claim 2, wherein $E_{lam}*E_{comp}/(E_{metal}*t_{metal})<200*Vf$ kN/mm$^4$.

18. The fiber-metal laminate according to claim 1, wherein the fiber volume fraction of the fiber-reinforced composite layers satisfies 0.40≤$V_f$<0.50 and the thickness of the metal sheets is 0.5 mm<$t_{metal}$≤1.2 mm.

* * * * *

UNITED STATES PATENT AND TRADEMARK OFFICE
CERTIFICATE OF CORRECTION

PATENT NO. : 9,919,495 B2  
APPLICATION NO. : 14/355119  
DATED : March 20, 2018  
INVENTOR(S) : Gregory Wilson et al.

Page 1 of 1

It is certified that error appears in the above-identified patent and that said Letters Patent is hereby corrected as shown below:

On the Title Page

Column 1, Page 2, Line 15, Item (57), delete "$V_f$" and insert -- Vf --

In the Claims

Column 14, Line 63, Claim 1, after "bound" delete "value"

Column 14, Line 67, Claim 1, after "bound" delete "value"

Column 15, Line 18, Claim 1, delete "$V_f$" and insert -- Vf --

Column 16, Line 8, Claim 11, after "bound" delete "value"

Column 16, Line 12, Claim 11, after "bound" delete "value"

Column 16, Line 14, Claim 11, delete "c = 1" and insert -- c = 0 --

Column 16, Line 31, Claim 11, delete "$V_f$" and insert -- Vf --

Column 16, Line 34, Claim 12, delete "kN/mm4;" and insert -- $kN/mm^4$; --

Column 16, Line 46, Claim 16, delete "$t_{metal}$" and insert -- $t_{metal}^2$ --

Column 16, Line 48, Claim 17, delete "$t_{metal}$" and insert -- $t_{metal}^2$ --

Column 16, Line 51, Claim 18, delete "$V_f$" and insert -- Vf --

Signed and Sealed this  
Twenty-third Day of October, 2018

Andrei Iancu  
*Director of the United States Patent and Trademark Office*